(12) United States Patent
Horsch

(10) Patent No.: US 6,793,246 B2
(45) Date of Patent: Sep. 21, 2004

(54) KNEE SUPPORT FOR OCCUPANTS

(75) Inventor: Guido Horsch, Althengstett (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 16 days.

(21) Appl. No.: 10/247,624

(22) Filed: Sep. 20, 2002

(65) Prior Publication Data

US 2003/0057760 A1 Mar. 27, 2003

(30) Foreign Application Priority Data

Sep. 21, 2001 (DE) .......................................... 101 46 495

(51) Int. Cl.$^7$ .......................................... B60R 21/045
(52) U.S. Cl. ...................................... 280/751; 280/752
(58) Field of Search .............................. 280/751, 752; 296/70; 297/487, 488

(56) References Cited

U.S. PATENT DOCUMENTS

| | | | |
|---|---|---|---|
| 3,931,988 A | * | 1/1976 | Oehm et al. ................. 280/751 |
| 4,709,943 A | | 12/1987 | Yoshimura et al. |
| 5,037,130 A | | 8/1991 | Okuyama |
| 5,273,314 A | | 12/1993 | Sakakibara |
| 5,577,770 A | | 11/1996 | Sinner et al. |
| 5,752,718 A | * | 5/1998 | Schnabel et al. ........... 280/752 |
| 5,865,468 A | * | 2/1999 | Hur ........................ 280/752 X |
| 5,927,755 A | * | 7/1999 | Matsuo et al. .............. 280/752 |
| 6,086,098 A | | 7/2000 | Reiter et al. |
| 6,170,872 B1 | | 1/2001 | Bair et al. |

FOREIGN PATENT DOCUMENTS

| | | |
|---|---|---|
| DE | 4003952 | 8/1991 |
| DE | 19511512 | 2/1996 |
| DE | 19502226 | 5/1996 |
| DE | 19756334 | 7/1999 |
| JP | 5213128 | 8/1993 |
| JP | 07081508 | 3/1995 |

* cited by examiner

Primary Examiner—Anthony D. Barfield
(74) Attorney, Agent, or Firm—Crowell & Moring LLP

(57) ABSTRACT

A knee support is arranged in the area of a control panel inside a passenger compartment of a body of a motor vehicle and exhibits a transverse frame member, which is provided with at least one deformation element. The deformation element, covered at least in areas in relation to the passenger compartment by a support wall of the control panel, includes a first bracket segment, which is in alignment with the knee impact areas, and a second bracket segment, which is connected to the transverse frame member, in such a manner that the first bracket segment absorbs energy primarily by flection; the second bracket segment, as a function of the load by compression and/or flection; and optionally the transverse frame member absorbs energy as a function of the load by flection and/or by torsion.

17 Claims, 3 Drawing Sheets

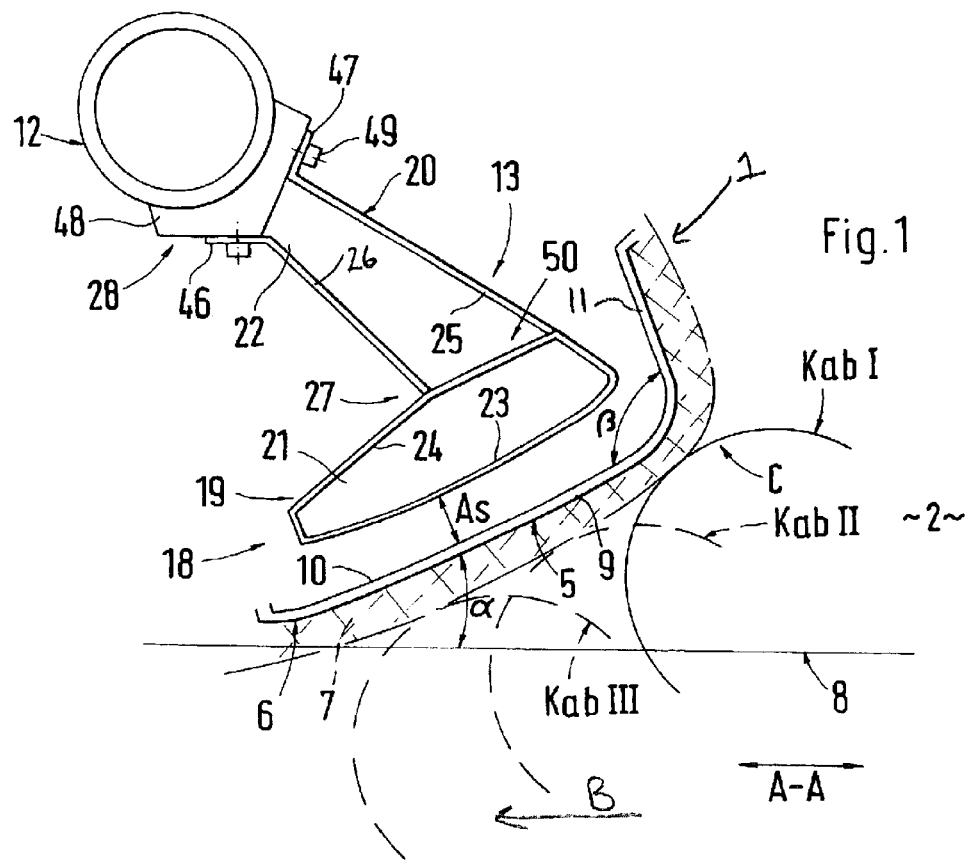
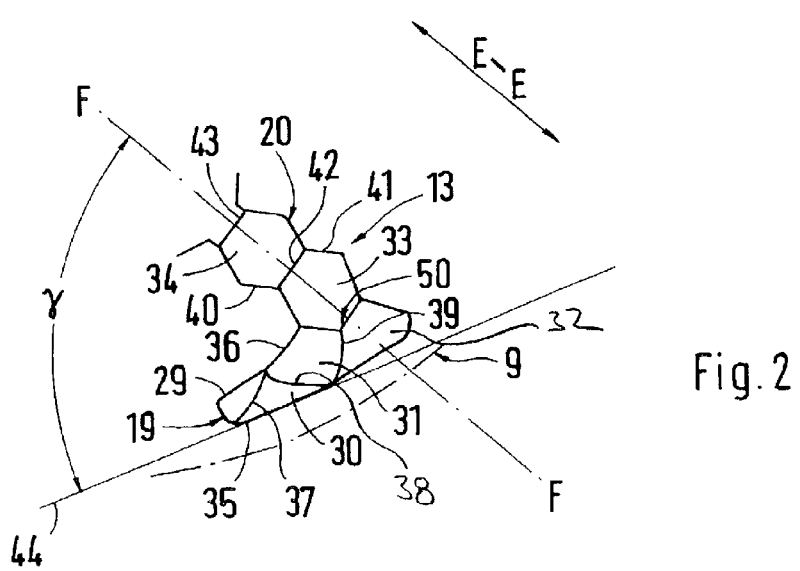

KNEE SUPPORT FOR OCCUPANTS

This application claims the priority of Application No. 101 46 495.9, filed Sep. 21, 2001 in Germany, the disclosure of which is expressly incorporated by reference herein.

The present invention relates to a knee support for occupants of motor vehicles, in particular passenger cars.

German Patent Document No. DE 40 03 952 A1 discloses a knee catcher, which is provided with a knee impact element, which is disposed in the region below the instrument panel and extends in the transversal direction of the motor vehicle and has deformation means for the absorption of energy. The knee impact element is designed as a transverse frame member that is resistant to bending and whose one end region is braced by means of a deformation element against the body.

U.S. Pat. No. 4,709,943 discloses a knee support, which is installed in a motor vehicle, is covered by a support wall of a control panel, and exhibits a shock absorbing bracket. The shock absorbing bracket is attached by means of retaining elements to a transverse frame member, which is connected to side frame structures. Impact energy-absorbing devices are provided between the shock absorbing bracket and the retaining elements.

U.S. Pat. No. 5,273,314 discloses a comparable knee support with a deformation element, which extends, as seen in the longitudinal direction of the motor vehicle, from the support wall of the control panel as far as to the transverse frame member. The deformation element is designed along the line of a bracket and exhibits separate bracket walls, which are connected together by means of webs. The thickness of the bracket walls and of the webs varies. That is, it increases starting from the support wall as far as up to the transverse frame member.

The object of the present invention is to improve a knee support in such a manner that it is suitable for persons of different body sizes and performs a high degree of deformation work during a defined collision.

The advantages, achieved predominantly with the invention, lie in the fact that the first bracket segment and the second bracket segment of the deformation element together with the support wall and the connection of the deformation element with the transverse frame member are suitable for specific energy absorption; and upon a defined collision of the motor vehicle, the occupants' knees are largely protected by means of the knee support that is designed thus. In this respect the support wall and the first bracket segment are arranged and designed in such a manner that they also introduce and transfer reliably impact forces from occupants of different body sizes. The deformation element is easy to produce and can be connected to the transverse frame member. Finally the knee support exhibits an excellent function when two deformation elements are provided at the transverse frame member in the area of the occupants' knees.

One embodiment of the invention is depicted in the drawings and is explained in detail below.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal view of a motor vehicle in the area of a control panel with the knee support, according to the present invention.

FIG. 2 is a detail of FIG. 1 on a smaller scale.

DETAILED DESCRIPTION OF THE DRAWINGS

Figure 3:
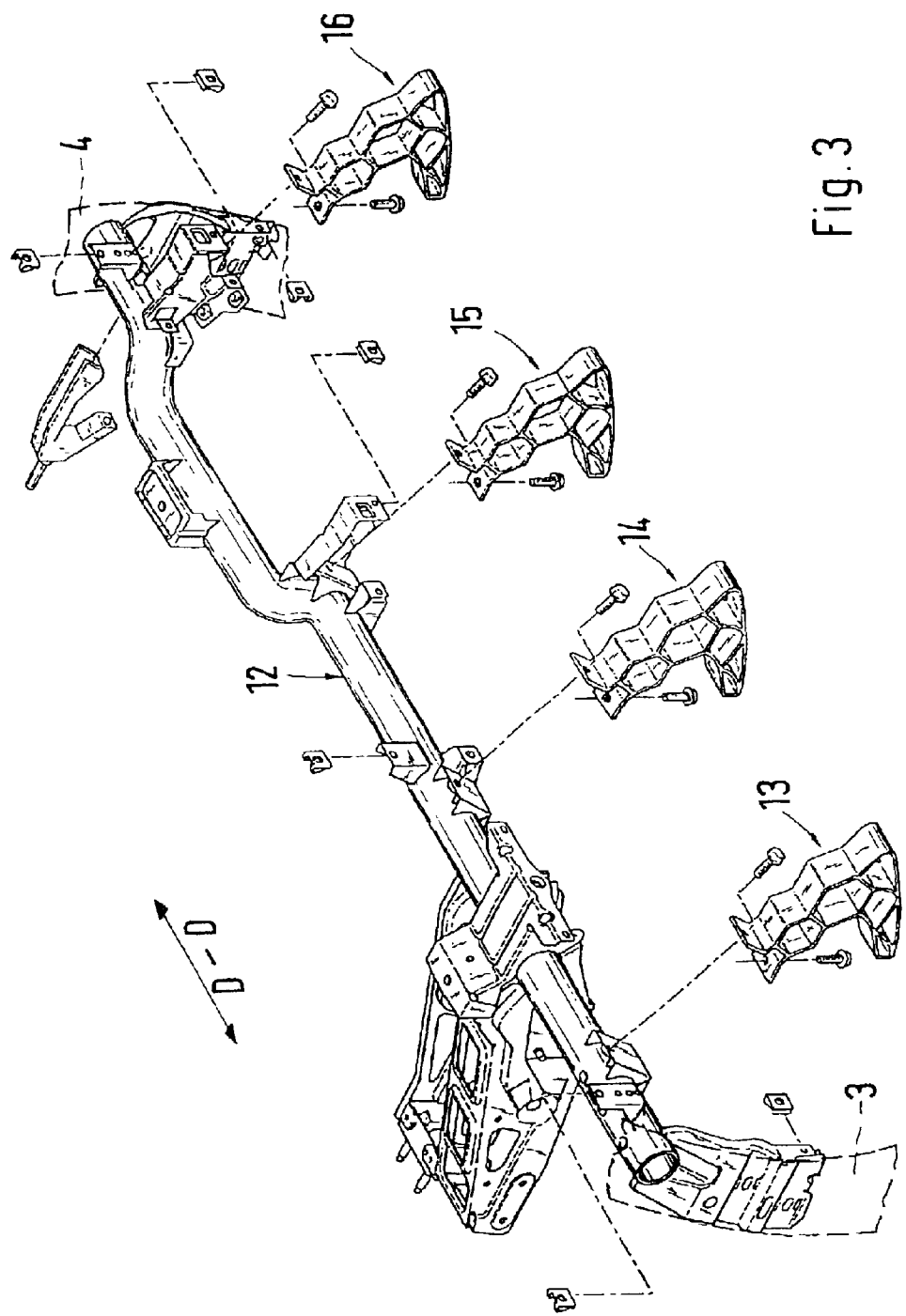
FIG. 3 is an oblique view, starting from the left side of the motor vehicle, of the knee support, according to the invention.

Of a motor vehicle, for example of the passenger car class, only a control panel 1 is shown that extends at right angles to the motor vehicle longitudinal direction A—A in a passenger compartment 2 between rigid lateral body structures 3, 4, as shown in FIG. 3, or A-pillars. The control panel 1 comprises an angle frame 5, whose side 6, facing the passenger compartment 2, is provided with padding 7. When seen in the cross section, the angle frame 5 exhibits a leg 10, which runs at the bottom at an angle $\alpha$ ranging from approximately 27 degrees to 32 degrees with respect to a horizontal line 8 and which is designed as a support wall 9 rising in the opposite direction of travel B, and an upper leg 11, which faces upward in the direction of travel B. The legs 10 and 11 enclose an angle $\beta$ of approximately 97 degrees. At C, that is, at the transition between leg 10 and leg 11, a first knee impact area Kab I of a 95% man touches the padding 7 or the support wall 9. Below it there are also the knee impact areas Kab II and Kab III of a 50% man or a 5% woman. The knee impact areas Kab I, Kab II and Kab III embody occupants with different body sizes.

When seen in the direction of travel B, a transverse frame member 12, which is held on the side body structures 3, 4, is in front of the control panel 1. The transverse frame member 12 is connected to the deformation elements 13, 14, 15, 16, which together with the support wall 9 of the control panel 1 form in essence a knee support 18. In the event of an accident-induced collision of the motor vehicle, the knee support 18 absorbs the knee impact of the occupants in such a manner that the knee forces, issuing from the knee impact areas Kab I, Kab II and Kab III, remain within the specified values. In the embodiment, the driver side and the front passenger side exhibit two deformation elements 13, 14, or 15, 16, respectively, as seen in FIG. 3, and in particular, for example, when seen in the motor vehicle transverse direction D—D, laterally outside the knees of the driver and the front passenger. However, other types of arrangements of the deformation elements are also conceivable.

Each deformation element, for example deformation element 13, exhibits a first bracket segment 19, which runs along the support wall 9 of the control panel 1, and an additional bracket segment 20, both of which constitute a configuration for the defined deformation. The first bracket segment 19 is aligned in the direction of the knee impact areas Kab I, Kab II and Kab III; and the second bracket segment 20 is connected to the transverse frame member 12. The bracket segments 19 and 20 and the transverse frame member 12 are designed and arranged in such a manner with respect to each other that the first bracket segment 19 absorbs energy by means of flection; the second bracket segment 20 by means of compression; and the transverse frame member 12 absorbs energy by means of flection and optionally also torsion. In this respect the support wall 9, exhibiting energy-absorbing properties, and the first bracket segment 19 are designed to introduce and absorb the impact forces of occupants of different body sizes, a feature that is illustrated by means of the knee impact areas Kab I, Kab II and Kab III. Optimal structural conditions are achieved in that the support wall 9 runs at a defined constant distance As in relation to the bracket segment 19.

The first bracket segment 19 and the second bracket segment 20 are formed by means of hollow brackets 21, 22, which are defined by the first walls 23, 24 or the second walls 25, 26. In this respect the bracket segments 19, 20 are shaped and fitted together in such a manner that the result is a sickle-shaped configuration 27, which is suspended from the transverse frame member 12 at location 28.

FIG. 2 shows that the first bracket segment 19 and the second bracket segment 20 comprise individual hollow brackets 29, 30, 31, 32 or 33, 34. The individual hollow brackets 29, 30, 31, 32 are formed by means of a first bracket wall 35, a second bracket wall 36 and webs 37, 38, 39, which run at an angle to each other and which form a type of diagonal ribbing between the separated bracket walls 35, 36. The second bracket segment 20 is led away from the second bracket wall and exhibits, when seen in a longitudinal direction E—E of the bracket segment, the individual hollow brackets 33, 34, which are arranged in succession. In addition, there is a third bracket wall 40 and a fourth bracket wall 41, which are braced by means of the transverse webs 42, 43. The bracket walls 40, 41 and the transverse webs 42, 43 as well as the second bracket wall 36 in the area of the second bracket segment 20 form a hexagonal honeycomb structure. In addition, a central longitudinal plane F—F of the second bracket segment 20 extends at an obtuse angle γ of 80 degrees to the straight line 44, along which the first bracket wall 35 of the first bracket segment 19 runs.

The second bracket segment 20 is provided on the side at location 28, as seen in FIG. 1, facing the transverse frame member 12, with attachment flanges 46, 47, which are arranged at an angle to each other and which are held in position at a bracket 48 of the transverse frame member 12 by means of screws 49. In this respect the first bracket segment 19 and the second bracket segment 20 are arranged in such a manner to the transverse frame member 12, exhibiting a circular cross-section, that it contributes by means of torsion to optimizing the knee support 18.

The first hollow bracket segment 19 and the second bracket segment 20 can be made separately and assembled at 50 to form the deformation element 13. However, it is also possible to make the bracket segments 19, 20 out of one piece as an extruded part—light-weight metal, steel, plastic.

Figure 4:
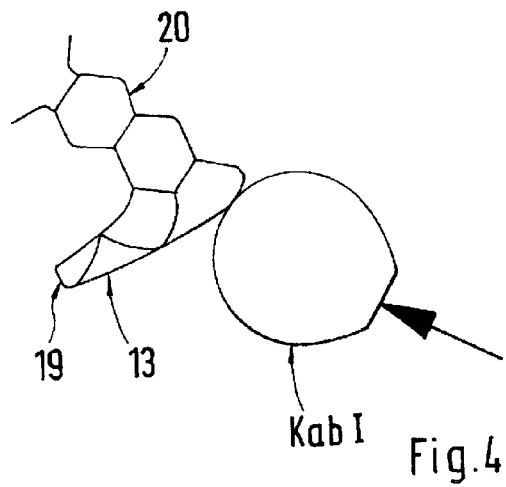
FIG. 4 is a view of a deformation element of the knee support with a first knee impact area.
Figure 5:
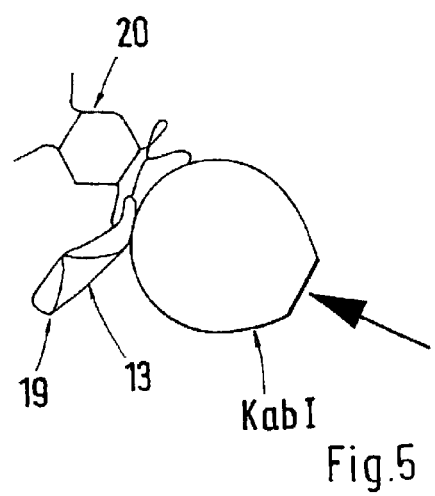
FIG. 5 is a view of the deformation element of FIG. 4 in a state deformed by means of a knee impact.
Figure 6:
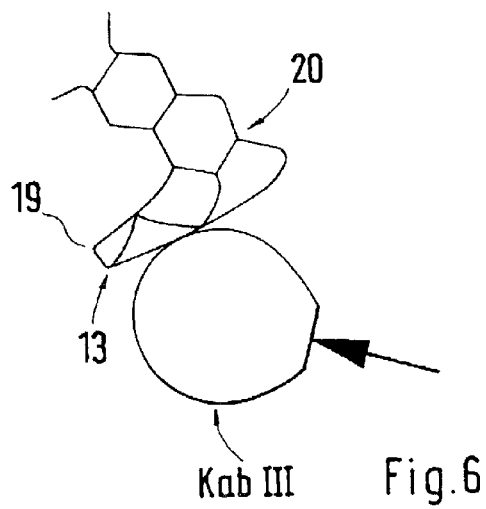
FIG. 6 is a view of the deformation element of the knee support with a second knee impact area.
Figure 7:
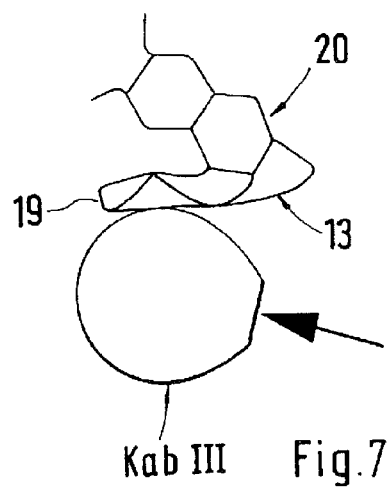
FIG. 7 is a view of the deformation element of FIG. 6 in a state deformed by means of a knee impact.

In FIGS. 4 and 5, the effect of the deformation element 13 is shown without the support wall 9. Thus, the knees of a 50% man in Kab II stress the deformation element 13, which absorbs the impact energy by means of flection of the bracket segment 19 and by means of compression of the bracket segment 20 for the protection of the knees of the occupants concerned. FIGS. 6 and 7 reproduce how the knees of a 5% woman strike the deformation segment 13. In this case the bracket element 19 responds to a load specifically by bending. Finally it is evident from the Figures that the deformation element 13 can be subjected to complex loads in such a manner that the first bracket segment 19 absorbs energy primarily by bending; the second bracket segment 20 absorbs energy as a function of the load either by means of compression and/or flection; and optionally the transverse frame member 12 absorbs energy by means of flection and torsion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A knee support for occupants of a motor vehicle, which is arranged in an area of a control panel inside a passenger compartment of a body of the motor vehicle and exhibits a transverse frame member, which extends at right angles to a longitudinal direction of the motor vehicle, is held at stationary, lateral body structures, and is provided with at least one deformation element, wherein the deformation element, covered at least in areas in relation to the passenger compartment by means of a support wall of the control panel, comprises a first bracket segment, which is in alignment with areas subject to occupant knee-impact, and a second bracket segment, which is connected at a first end to the transverse frame member and has a second end from which the first bracket segment depends, wherein the first bracket segment absorbs energy primarily by means of flection, the second bracket segment deforms by means of compression longitudinally, and the transverse frame member absorbs energy as a function of load by means of flection and by means of torsion.

2. The knee support as claimed in claim 1, wherein the support wall of the control panel and the first bracket segment are designed to introduce impact forces over a range of knee impact areas, where the area of impact varies with occupants of different body sizes.

3. The knee support as claimed in claim 2, wherein the support wall is designed so as to absorb energy.

4. The knee support as claimed in claim 1, wherein the support wall runs at a defined distance relative to the first bracket segment.

5. The knee support as claimed in claim 1, wherein the first bracket segment and the second bracket segment are formed by means of hollow brackets which are defined by first walls and second walls.

6. The knee support as claimed in claim 5, wherein the first bracket segment and the second bracket segment are fitted together in such a manner that a result is a sickle-shaped configuration.

7. The knee support as claimed in claim 1, wherein the bracket segments comprise several individual hollow brackets.

8. The knee support as claimed in claim 7, wherein the individual hollow brackets of the first bracket segment are formed by means of webs between first and second bracket walls and the individual hollow brackets of the second bracket segment are formed by means of transverse webs between third and fourth bracket walls.

9. The knee support as claimed in claim 7, wherein the hollow brackets are made from one piece or as an extruded part, whereby light-weight metal or steel is used as a material.

10. The knee support as claimed in claim 1, wherein when seen in a transverse direction of the motor vehicle, two deformation elements are provided in an area subject to occupant knee-impact at the transverse frame member.

11. The knee support as claimed in claim 10, wherein the deformation elements are provided outside a structural position of the area subject to occupant knee-impact.

12. A knee support for an occupant of a motor vehicle, comprising:

a transverse frame member including a deformation element wherein the deformation element includes a first bracket segment and a second bracket segment, the second bracket segment connected at a first end to the transverse frame member and the first bracket segment depending from a second end of the second bracket segment, and wherein in response to a first force applied to the deformation element the first bracket segment absorbs the first force by flection and the second bracket segment absorbs the first force by compression longitudinally, and further wherein in response to a second force applied to the deformation element the first bracket segment absorbs the second force by flection and the second bracket segment absorbs the second force by flection.

13. The knee support as claimed in claim 12, further wherein the transverse frame member absorbs the first and second forces by torsion.

14. The knee support as claimed in claim 12, wherein the first force is applied to the deformation element at a first location on the first bracket segment where the first bracket segment joins the second bracket segment and wherein the second force is applied to the deformation element at a second location on the first bracket segment wherein the second location is lower on the first bracket segment than the first location.

15. A method for protecting the knees of an occupant of a vehicle with a transverse frame member including a deformation element wherein the deformation element includes a first bracket segment and a second bracket segment, the second bracket segment connected at a first end to the transverse frame member and the first bracket segment depending from a second end of the second bracket segment, comprising the steps of:

absorbing a first force applied to the deformation element by flexing the first bracket segment and compressing the second bracket segment longitudinally; and absorbing a second force applied to the deformation element by flexing the first bracket segment and flexing the second bracket segment.

16. The method as claimed in claim 15, further comprising the step of absorbing the first and second forces by the transverse frame member by torsion.

17. The method as claimed in claim 15, wherein the first force is applied to the deformation element at a first location on the first bracket segment where the first bracket segment joins the second bracket segment and wherein the second force is applied to the deformation element at a second location on the first bracket segment wherein the second location is lower on the first bracket segment than the first location.

* * * * *